R. M. CAUFFMAN & W. BEST.
PASTEURIZING APPARATUS.
APPLICATION FILED FEB. 24, 1908.

948,443.

Patented Feb. 8, 1910.
2 SHEETS—SHEET 1.

Witnesses:
George Oltsch
G. M. Cole

Robert M. Cauffman.
Wellington Best.
Inventors.

By
Attny.

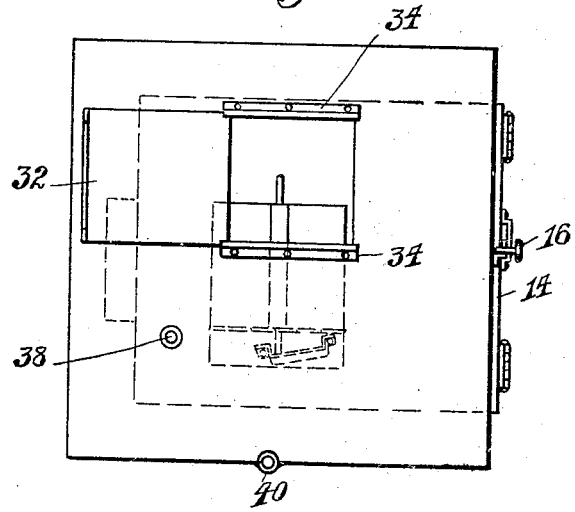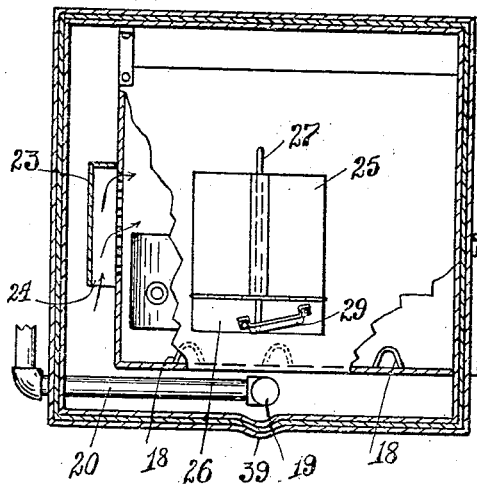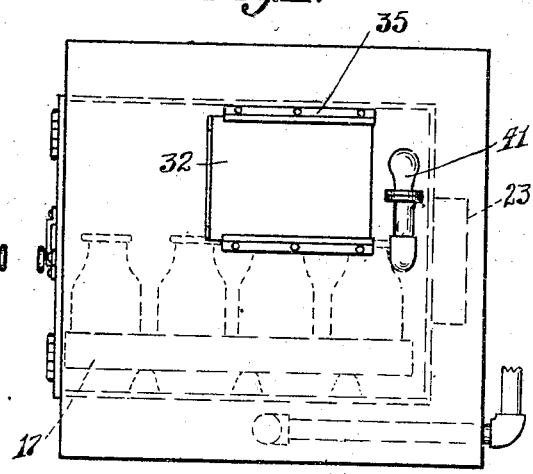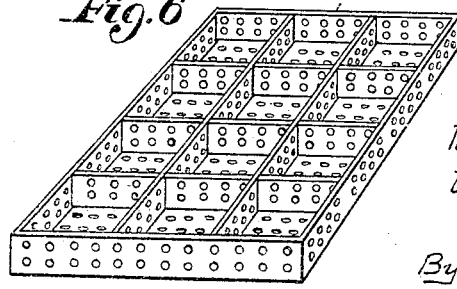

UNITED STATES PATENT OFFICE.

ROBERT M. CAUFFMAN AND WELLINGTON BEST, OF CENTERVILLE, MICHIGAN; SAID BEST ASSIGNOR TO SAID CAUFFMAN.

PASTEURIZING APPARATUS.

948,443.   Specification of Letters Patent.   Patented Feb. 8, 1910.

Application filed February 24, 1908. Serial No. 417,489.

*To all whom it may concern:*

Be it known that we, ROBERT M. CAUFFMAN and WELLINGTON BEST, citizens of the United States, residing at Centerville, in the county of St. Joseph and State of Michigan, have invented certain new and useful Improvements in Pasteurizing Apparatus, of which the following is a specification.

This invention relates to improvements in apparatus for treating milk and other articles of food for the purpose of pasteurizing the same, and has for one of its objects to improve the construction and increase the efficiency and utility of devices of this character.

Another object of the invention is to provide a simply constructed apparatus whereby the heating medium may be applied with greater uniformity and regularity to the food products or compounds, and without danger of over heating or under heating the same.

Another object of the invention is to provide a simply constructed apparatus whereby the temperature may be readily controlled and increased or decreased as desired, and wherein the degree of temperature may be known to the attendant at all times.

With these and other objects in view the invention consists in certain novel features of construction, as hereinafter shown and described and specifically pointed out in the claims.

Figure 1:
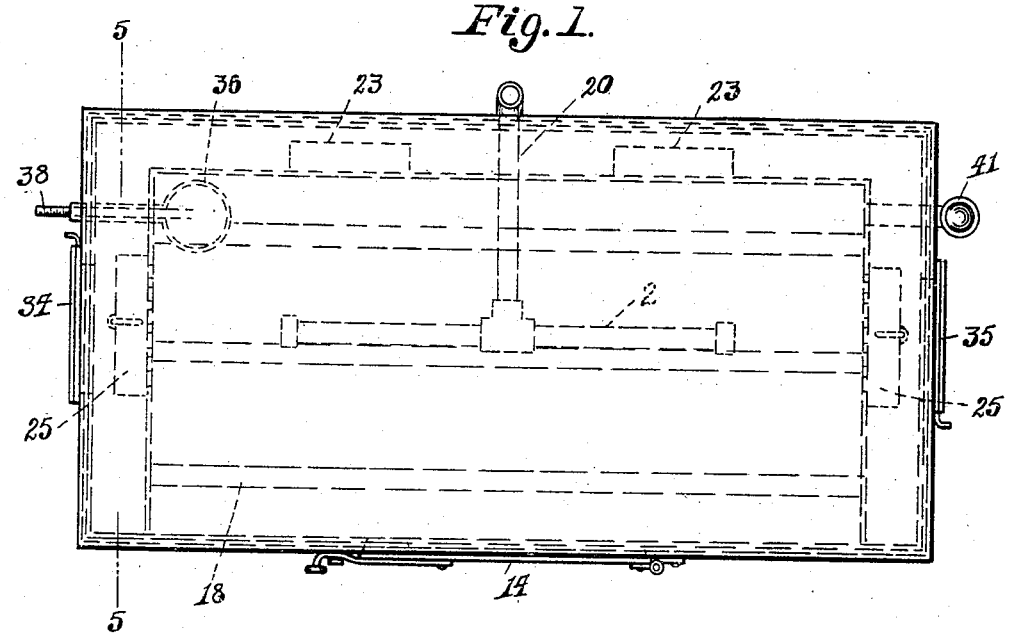
Figure 2:
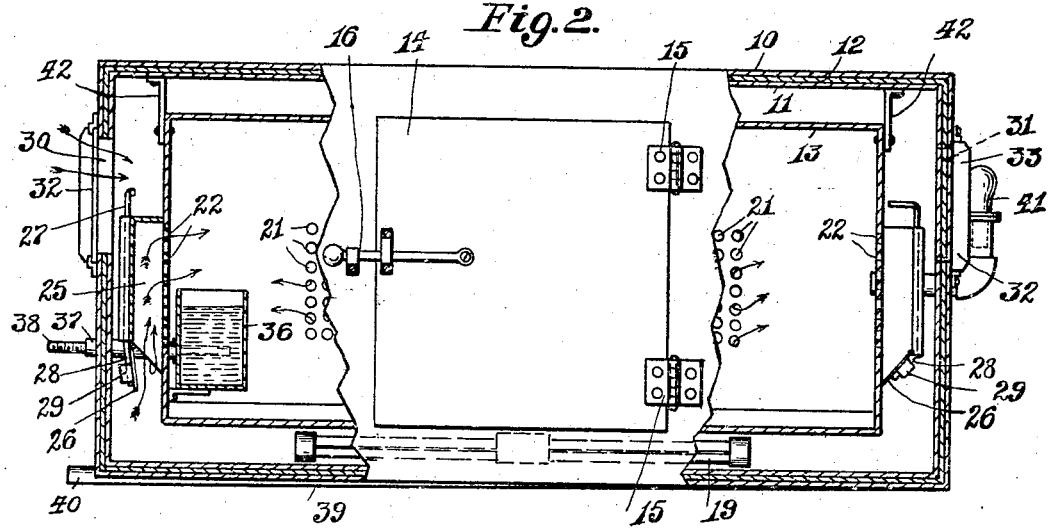

In the drawings is shown the preferred form of the embodiment of the invention, and in the drawings thus employed Figure 1 is a plan view of the improved apparatus. Fig. 2 is a side elevation from the front partly in section. Fig. 3 is an elevation from one end of the apparatus. Fig. 4 is an end elevation from the opposite end of the apparatus. Fig. 5 is a transverse section on the line 5—5 of Fig. 1. Fig. 6 is a perspective view of one of the trays for supporting the food products or compounds within the apparatus.

The improved apparatus comprises an outer casing, preferably of two or more thicknesses 10—11 of sheet metal preferably galvanized iron, and spaced apart with one or more layers of non-conductive material, such as asbestos, represented at 12, between the walls of the casing.

Disposed within the outer casing is an inner casing 13 of suitable sheet metal and spaced upon all sides except the front from the outer casing, the front of the inner casing bearing against the inner face of the front of the outer casing, as shown in Figs. 3, 4 and 5, the outer casing having a door 14 providing access to the inner casing. The door 14 is hinged as at 15 to the inner casing and provided at its free edges with a suitable latch device 16, the door being large enough to permit of the insertion and removal of the articles of food which are preferably disposed in perforated trays, one of which is illustrated at 17 in Fig. 6.

The lower side of the inner casing is formed with longitudinal ribs 18 upon which the trays 17 rest, and thus supported from the floor of the inner casing so that the heating medium will pass around all sides of the tray and of the food products supported thereby.

The heating medium will be supplied to the space between the inner and outer casings and will preferably be live steam, and to supply this live steam a perforated pipe section is disposed within the space between the bottom of the inner and outer casings, this pipe being represented at 19 and provided with a branch 20 leading through the outer casing, as shown. Any suitable steam supplying means may be employed, but as the steam generator is not a portion of the present invention it is not illustrated.

The inner casing 13 is provided at suitable points in its rear wall with transverse perforations 21, and with similar perforations 22 in the end walls, the perforations 21 being covered by hoods 23 open at their lower sides, as represented at 24 in Fig. 5, while the end perforations 22 are covered by similar hoods 25, the latter open at the lower sides and provided with closing valves 26 adapted to cover the openings. Suitable operating devices will be employed to control the valves 26, and for the purpose of illustration rods 27 are mounted for rotation upon the hoods 25, with the lower ends bent at an angle to the longitudinal plane of the rods, as shown at 28, the bent portions operating in diagonal guide strips 29 attached to the valves. By this arrangement it will be obvious that when the rods 27 are rotated the bent ends 28 acting within the guide strips 29 will open and close the valves 26, the extent of the opening being easily controlled by the extent to which the rods are operated.

The outer casing of the apparatus is provided at the ends with relatively large openings 30—31, the openings provided with closures 32—33, preferably slidable in guide ways 34—35, so that the openings may be uncovered to any required extent to admit any given quantity of cold air into the space between the outer and inner casings. The hoods 25 being located opposite the openings 30—31, the valve rods 27 are easily accessible through the openings, so that the valves 26 may be readily set to any desired extent by simply opening the closures 32—33, as will be obvious.

Located within the inner casing, preferably at one corner is a tank 36 for holding water, the tank provided with a tubular connection 37 leading out through both casings, and within this tubular connection is arranged a suitable thermometer device 38, readable from the exterior of the outer casing, so that the temperature of the water in the tank 36 may be ascertained at all times. It will be understood that it is not the object to ascertain the temperature of the inner casing, but that on the other hand it is the object to ascertain the temperature of the milk in the bottles in order to determine when the temperature has reached a point to properly pasteurize the milk. Thus the temperature of the milk within the bottles is ascertained approximately by the temperature of the water in the tank 36, in which one end of the thermometer is submerged, as one liquid will be substantially the same in temperature as the other, both being subjected to the same heating medium. The thermometer device employed consists simply of an ordinary tube thermometer within a tubular casing 37, which serves to protect the thermometer from the heat of the steam.

Within the bottom of the outer casing is arranged a longitudinal depression 39 inclined toward one end of the casing and provided with a discharge pipe 40 at its lower end to provide suitable drainings for the water of condensation. A suitable safety valve indicated at 41 is also connected to the apparatus, to prevent danger from undue pressure of steam in the apparatus.

The inner casing 13 is preferably suspended by hangers 42 from the inner casing, as shown in Fig. 2.

By this simple arrangement it will be obvious that when steam is admitted into the distributing pipe 19 it will pass around all sides of the inner casing except the front, and likewise pass through the perforations 21—22 into the interior of the inner casing, and thus come into direct contact with the receptacles of the food products supported in the tray, or otherwise disposed within the inner casing. The steam thus freely circulates around the exterior and, within the interior of the inner casing, and subjects the food products both to the direct and indirect influence or action of the steam, thereby utilizing to the fullest extent the best accurate properties of the steam.

The air intakes 30—31 are an important feature of the invention and permit the proper mixing of air and steam by which any sudden heating of the bottles or other vessels containing the food products is prevented and thus also preventing loss of bottles or other fragile receptacles by breaking them. The cold air apertures are also utilized to prevent a sudden rise in temperature which would be liable to fracture the bottles. By this arrangement a comparatively small amount of steam only is required to produce a relatively high temperature which may be uniformly maintained at any required degree by manipulating the closures 32—33 and the valves 26, as before described, the degree of temperature being readily ascertained by consulting the thermometer device 38.

When the milk is to be treated in the apparatus it is first passed through a centrifugal machine which clarifies the milk and the milk and cream aerated and cooled and thoroughly mixed and strained in the sterilized bottles which are then placed on the trays 17 and inserted through the door 14 into the inner casing as before described and supported upon the ribs 18. The milk is thus in condition and position to be pasteurized at a temperature of 180° to 200° for thirty minutes more or less, after which the bottles are instantly sealed.

The apparatus may also be employed in cheese factories and in creameries to enable the cheese makers and butter makers to supply milk admirably adapted for starter making.

The improved apparatus may be manufactured in any required size or capacity, and may be manufactured for farmers having a limited supply of milk or employed upon the larger dairy farms, creameries, or cheese factories, as above stated.

The thermometer device 38 projecting into the water in the tank 36, and the temperature of the water being always slightly greater than the milk, or other food products within the inner casing, the temperature is readily ascertainable and by a little practice the operator may be able to maintain the temperature of the milk or other products at any degree required. The operator is thus in position to intelligently manipulate the cold air supply and the valve 26, as will be obvious.

What is claimed is—

1. In an apparatus of the class described, an outer and an inner casing spaced apart, means for supplying heat to the space between the casings, a tank within the inner casing and adapted to contain liquid, a thermometer device connected to said tank and extending to the exterior of the casings to determine the temperature of the liquid in said tank and thereby determine approximately the temperature of the milk being pasteurized within the bottles disposed in the apparatus, said inner casing having perforations providing communication between the inner casing and the space between the casings, and means in the interspace for controlling the flow of the heating medium through the apertures.

2. In an apparatus of the class described, an outer and inner casing spaced apart, means for supplying heat to the space between the casings, said inner casing having apertures providing communication between the inner casing and the space between the casings, hoods disposed over said apertures and open at their lower sides, valves operating to control the flow of heat to said hoods, and means for adjusting said valves.

3. In an apparatus of the class described, an outer and an inner casing spaced apart, said outer casing having air apertures, adjustable closures for said air apertures, means for supplying heat to the space between the casings, said inner casing having apertures providing communication between the inner casing and the space between the casings, and hoods over said apertures and open at their lower sides.

4. In an apparatus of the class described, an outer and an inner casing spaced apart, the outer casing having air apertures leading therethrough, adjustable closures for said apertures, means for supplying heat to the space between the casings, said inner casing having apertures providing communication between the inner casing and the space between the casings, hoods over said apertures and open at their lower sides, valves operating to control the heat passing through said hoods and means for adjusting the said valves.

5. In an apparatus of the class described, an outer and an inner casing spaced apart, the outer casing having air apertures communicating with the space between the casings, adjustable closures for said air apertures, means for supplying heat to the space between said casings, said inner casing having apertures in its ends providing communication with the space between the casings, and hoods disposed over said apertures and open at the lower sides.

6. In an apparatus of the class described, an outer and an inner casing spaced apart, the outer casing having air apertures communicating with the space between the casings, adjustable closures for said air apertures, means for supplying heat to the space between said casings, the inner casing having apertures in its ends communicating with the space between the casings, hoods disposed over said latter apertures and open at the lower side, valves operating to control the passage of heat through said hoods, and means for controlling said valves and disposed in a position to be accessible through said air apertures.

7. In an apparatus of the class described, an outer and an inner casing spaced apart, said inner casing having transverse apertures providing communication with the space between the casings, and said outer casing having air apertures communicating with the space between the casings, adjustable closures for said air apertures, hoods disposed over the apertures of the inner casing and open at the lower side, means for supplying heat to the space between the casings, valves operating to control the flow of heat through the hoods, means for controlling said valves and accessible through said apertures, a tank for holding liquid disposed within said inner casing, and a thermometer device connected into said tank and extending through said casing to determine the temperature of the liquid in said tank and thereby determine approximately the temperature of the milk being pasteurized within the bottles disposed in the apparatus.

8. In an apparatus of the class described, an outer casing and an inner casing, means for supplying heat to the space between the casings, said inner casing having communication with the space between the casings, means for controlling the flow of the heating medium through the communication between the inner casing and said space, said outer casing having an air opening, and a closure for said air opening.

9. In an apparatus of the class described, an outer and inner casing spaced apart, means for supplying heat to the space between the casings, said inner casing having apertures providing communication between the inner casing and the space between the casings, hoods disposed over said apertures and open at their lower sides, valves operating to control the flow of heat to said hoods.

In testimony whereof we affix our signatures, in presence of two witnesses.

ROBERT M. CAUFFMAN.
WELLINGTON BEST.

Witnesses:
GEORGE OLTSCH,
G. M. COLE.